F. J. TONE.
APPARATUS FOR TESTING HARDNESS.
APPLICATION FILED MAY 7, 1915.
1,283,362.
Patented Oct. 29, 1918.
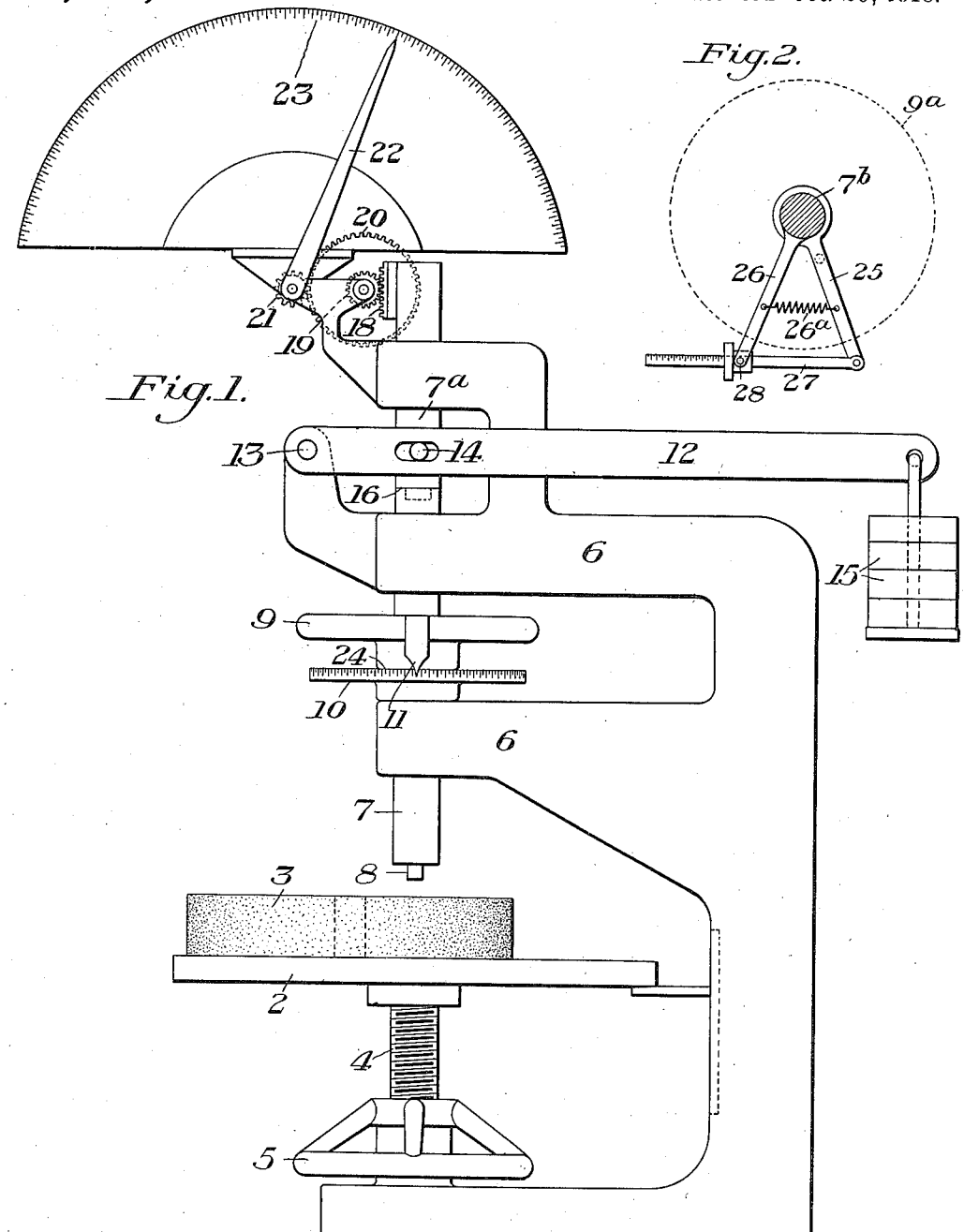

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

APPARATUS FOR TESTING HARDNESS.

1,283,362.  Specification of Letters Patent.  Patented Oct. 29, 1918.

Application filed May 7, 1915. Serial No. 26,491.

*To all whom it may concern:*

Be it known that I, FRANK J. TONE, a citizen of the United States, residing at Niagara Falls, in the county of Niagara and State of New York, have invented a new and useful Improvement in Apparatus for Testing Hardness, of which the following is a full, clear, and exact description, reference being had to the accompanying drawings, forming part of this specification, in which—

Figure 1 is a side elevation of one form of apparatus embodying my invention;

Fig. 2 is a detail view of a torque-measuring attachment.

My invention has relation to a machine or device for testing the hardness of grinding wheels and similar mineral substances. Grinding wheels are regularly made in a variety of grades with regard to hardness, toughness and resistance to crushing, depending upon the particular work which they are to do. This range of grades is obtained in artificial grinding wheels by changes in the methods of manufacture, such as the use of different bonding materials, different methods of baking and firing or maturing the same, and also by changes in the character of the abrasive materials used.

It is desirable to have some simple and reliable means by which the hardness of the finished wheels can be tested so as to determine whether or not they conform to specifications or are suitable for the particular work for which they are intended. It has been customary heretofore to test such wheels by the use of a hand tool shaped somewhat like a narrow chisel. By punching the surface of the grinding wheel with this chisel and carefully noting the pressure used, the penetration of the tool and the feel of the material as it yields into the tool, an operator who is skilled in this particular work can establish grades of hardness with fair satisfaction. Any absolute standards are, however, impossible in this practice, on account of the wide individual differences in different operators.

My invention provides a mechanical testing apparatus, by means of which the hardness of the wheel is indicated on a scale, and by the use of which the grade of any particular wheel as to hardness can be readily determined in an accurate manner.

Referring to the accompanying drawings, in which I have shown a preferred embodiment of my invention, the numeral 2 designates a table, upon which the wheel 3 or other article to be tested is placed. This table is mounted upon the vertically adjustable screw 4, which may be raised and lowered by means of the hand wheels 5.

Mounted above the table in the overhanging portions of the frame or bracket 6 is a vertically movable shaft 7, carrying at its lower end a testing tool 8. The cutting point of this tool preferably consists of a flat piece of steel about five-sixteenths of an inch wide and one-sixteenth of an inch in thickness. This cutting point in rotating bores its way into the test piece by what may best be described as a rotary shearing action, as distinguished from a mere penetrating action under pressure. 9 designates a hand wheel which is rigidly attached to the shaft 7, and by means of which the shaft and tool can be revolved through a definite arc. This arc can be measured by a fixed dial 10, provided for such purpose, the wheel having a pointer 11, arranged to traverse such dial.

The numeral 12 designates a lever pivoted to the frame at 13, and having a slotted engagement at 14 with the non-rotatable portion 7ª of the shaft 7. This lever is provided with a weight or series of weights 15, which causes the lever to exert a direct downward pressure on the shaft 7 for the purpose of putting constant pressure on the tool. The upper portion 7ª of the shaft 7 is non-rotatable, but has a joint with the lower section 7 at 16, which permits rotation of said lower section.

The depth of cut of the cutting point of the tool into the stone is measured by the amount of vertical movement of the shaft 7. This may be indicated in any suitable manner. In the arrangement shown, the upper shaft section 7ª has a rack 18, which engages a pinion 19 having an attached spur gear 20 which meshes with the pinion 21 on the axis of the hand or pointer 22 arranged to traverse the scale or dial 23.

In using the device, the wheel or test piece 3 is placed on the table 2, and the table is raised until the test piece comes in contact with the tool. It is then further raised until the shaft 7 is free from its seat on the frame at 24 and the pointer 22 comes to zero on the scale 23. The shaft 7 is now revolved by means of the hand wheel 9 through a measured arc or peripheral distance or for a certain number of revolutions. This causes the tool to cut into the grinding wheel a certain distance, depending upon the hardness of the wheel, the depth of cut being indicated on the dial 23. The weights 15 can be changed for different classes of material and also according to the extent to which the tool is rotated. These factors must be determined by a series of experiments and are kept constant when testing the same class of materials or materials which are designed to give the same grade. It will be noted that for any particular adjustment of the device, the pressure exerted on the tool is predetermined and is substantially constant in amount.

In place of the scale 23 for measuring depth of cut it is, of course, possible to arrange the apparatus so that an ordinary micrometer may be used for this purpose.

Various other form and contours of tools may be used in place of that described, it being only necessary to employ a tool which will penetrate the material tested, in the manner before described and which is of such shape that the depth of cut will be a measure of the hardness of the material. In certain cases, it may be desirable to also measure the torque required to revolve the tool, as well as the penetration. For this purpose, any well known device may be employed, which will measure or indicate the torque applied to the hand wheel 9.

One form of such device is indicated in Fig. 2. In this figure, the hand wheel 9ª (shown in dotted lines) is indicated as being attached to a lever arm 25, which is loosely mounted on the spindle 7ᵇ, corresponding to the spindle 7 of Fig. 1. 26 is a lever which is rigidly attached to said spindle, motion being communicated to the spindle from the hand wheel 9ª and lever arm 25 to the lever 26 and spindle 7ᵇ, through a spring 26ª. The extent of elongation of this spring is the measure of the torque required to revolve the spindle. This is measured by a sliding arm 27, pivotally attached to the lever arms 25 and 26, and sliding through the pin 28, attached to the lever 26.

My invention has an application wider than that of grinding wheels and may be used for various classes of natural or artificial stone and mineral substances where a test for hardness is required.

I claim:

1. An apparatus for testing hardness, comprising a support for the test piece, a revoluble tool adapted to cut or penetrate the test piece, means for applying a measured pressure to the tool, means for rotating the tool, and means whereby the torque required to revolve the tool may be measured, substantially as described.

2. An apparatus for testing hardness, comprising a support for the test piece, a revoluble tool adapted to cut or penetrate the test piece, means for applying a measured pressure to the tool, means for revolving the tool through a measured peripheral distance, means for measuring the penetration of the tool, and means whereby the torque required to revolve the tool may also be measured, substantially as described.

3. An apparatus for testing hardness, comprising a rotary cutting tool adapted to cut into the material of a test piece, means for rotating said tool, a weight arranged to exert a substantially constant pressure on the tool during its cutting operation, and means for indicating the depth of the cut made by the tool during a definite rotation of the same, together with means for measuring the torque required to rotate the tool while cutting; substantially as described.

In testimony whereof, I have hereunto set my hand.

FRANK J. TONE.

Witnesses:
H. W. MEARS,
F. H. TAYLOR.